US011204744B1

(12) United States Patent
Reynolds et al.

(10) Patent No.: US 11,204,744 B1
(45) Date of Patent: Dec. 21, 2021

(54) MULTIDIMENSIONAL DIGITAL EXPERIENCE ANALYSIS

(71) Applicant: International Business Machines Corporation, Armonk, NY (US)

(72) Inventors: David M. Reynolds, Greenville, WI (US); Dennis Anthony Perpetua, Jr., Jay, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/883,051

(22) Filed: May 26, 2020

(51) Int. Cl.
*G06F 8/38* (2018.01)
*H04L 29/08* (2006.01)
*G06Q 30/02* (2012.01)
*G06F 16/9535* (2019.01)

(52) U.S. Cl.
CPC ............ *G06F 8/38* (2013.01); *G06F 16/9535* (2019.01); *G06Q 30/02* (2013.01); *H04L 67/306* (2013.01)

(58) Field of Classification Search
CPC ....... G06F 8/38; G06F 16/9535; G06Q 30/02; H04L 67/306
See application file for complete search history.

(56) References Cited

U.S. PATENT DOCUMENTS

| 6,405,159 | B2 | 6/2002 | Bushey |
| 7,013,238 | B1 | 3/2006 | Weare |
| 2016/0078347 | A1 | 3/2016 | Mastooreh |
| 2019/0012251 | A1 | 1/2019 | Farzad |
| 2019/0081949 | A1 | 3/2019 | Felix |
| 2019/0370139 | A1 | 12/2019 | Vichare |
| 2021/0081189 | A1* | 3/2021 | Nucci ...................... G06F 8/65 |

* cited by examiner

*Primary Examiner* — Yassin Alata
(74) *Attorney, Agent, or Firm* — Brian Restauro, Esq.; Kevin P. Radigan, Esq.; Heslin Rothenberg Farley & Mesiti P.C.

(57) ABSTRACT

Embodiments of the present invention provide methods, computer program products, and systems. Embodiments of the present invention can be used to develop real-time groupings of computing devices based on dynamic attributes. Embodiments of the present invention can then identify trends between the developed real-time groupings of computing devices. Embodiments of the present invention can further generate one or more recommendations to remedy a problem associated with a computing device within the developed, real-time grouping.

20 Claims, 8 Drawing Sheets

UXI Score = 3
Attribute 1 = Browser v4
Attribute 2 = Operating System 10
Attribute 3 = Crashed on www.website1.com
Attribute 4 = OS Patch 5

UXI Score 4
Attribute 1 = Browser v4
Attribute 2 = Operating System 10
Attribute 3 = Worked on www.website1.com
Attribute 4 = OS Patch 6

| APPLICATION | ATTRIBUTE | WEIGHT |
|---|---|---|
| CAD PROGRAM | V1 | 2 |
| CAD PROGRAM | PATCH 1 | 3 |
| TEXT PROCESSOR | | |

SUB COMPONENTS AND VERSIONS

| NAME | USERS |
|---|---|
| KB3112567 (UPDATE) | SUPERSEDED  6,993 |
| KB3115421 (UPDATE) | SUPERSEDED  6,881 |
| KB3115419 (UPDATE) | 2,390 |
| KB3114862 (UPDATE) | SUPERSEDED  2,292 |
| KB4475589 (UPDATE) | 1,607 |
| KB3178667 (UPDATE) | 1,385 |

MULTIDIMENSIONAL DIGITAL EXPERIENCE ANALYSIS

BACKGROUND

The present invention relates generally to device analytics, and more particularly to improving device designs and product implementation that improves a client experience.

Typically, analytics refers to a discovery, interpretation, and communication of meaningful patterns in data. It relies on the simultaneous application of statistics, computer programming and operations research to quantify performance.

The Internet of things (IoT) generally refers to a system of interrelated computing devices, mechanical and digital machines provided with unique identifiers (UIDs) and the ability to transfer data over a network without requiring human-to-human or human-to-computer interaction. It can extend to include multiple technologies, real-time analytics, machine learning, commodity sensors, and embedded systems. Traditional fields of embedded systems, wireless sensor networks, control systems, automation (including home and building automation), and others all contribute to enabling the Internet of things. For example, it can include products pertaining to the concept of the "smart home", covering devices and appliances (such as lighting fixtures, thermostats, home security systems and cameras, and other home appliances) that support one or more common ecosystems, and can be controlled via devices associated with that ecosystem, such as smartphones and smart speakers.

SUMMARY

Embodiments of the present invention provide computer-implemented methods, computer program products and systems. In one embodiment of the present invention, a computer-implemented method is provided for developing real-time groupings of computing devices based on dynamic attributes; identifying trends between the developed real-time groupings of computing devices; and generating one or more recommendations to remedy a problem associated with a computing device within the developed, real-time grouping.

DETAILED DESCRIPTION

Embodiments of the present invention recognize deficiencies in device analytics. For example, embodiments of the present invention recognize that data collection on devices can be used to measure application performance as experienced by users and that these application performance metrics currently lack a variety of contextually relevant factors that may cause trends in performance that are hidden within data being outputted by these applications. Specifically, embodiments of the present invention recognize that current solutions utilize a single dimension of metrics without contextual information. For example, given that two devices have equal specifications (e.g., in terms of hardware capabilities), one device may have a poorer user experience, embodiments of the present invention can identify what may be causing the poorer user experience and generate recommendations and execute the generated recommendations to improve the performance and experience of the device. Conversely, where two devices are performing equally, yet one device has been designed to perform better (e.g., a better graphics card), embodiments of the present invention can identify or otherwise highlight the problem and take actions to remediate the poorer performance.

Embodiments of the present invention can incorporate user expectation to allow device analytic metrics to be modified. For example, embodiments of the present invention can create this user feedback loop that can contribute to future project designs, including application upgrades, modernization, hardware refresh, and other end user factors. Embodiments of the present invention establishes a set of action taken, in other words expected outcome-oriented criteria by which development and support can build or enable future designs that yield targeted improvement in client experience. Embodiments of the present invention proactively identify a way to improve experience within the existing iteration of an application which leads to improved application performance.

In one embodiment, the solutions provided by the present invention can take multiple inputs beyond what is captured today by end-user experience monitoring tools. For example, embodiments of the present invention can account for an application profile, a persona profile, and user feedback.

As used herein, an "application profile" refers to a set of metadata elements, policies, and guidelines defined for a particular application. The elements may come from one or more element sets, thus allowing a given application to meet its functional requirements by using metadata from several element sets—including locally defined sets. An application profile may also include infrastructure information, RAM capacity, I/O expectation, .net versus java, etc.

User feedback refers to information you get from your users regarding whether or not a user or a group of users are satisfied with an application, service, hardware, etc. User feedback can include comments and suggestions by a user. The comments can include suggestions for improvement, indicated levels of satisfaction, and user perception of performance. Embodiments of the present invention provides mechanisms for users to opt-in or opt-out of data collection. Some embodiments of the present invention can transmit notifications to a user when user data is being collected or otherwise accessed.

A persona profile refers to individual information associated with a user and can be found in a user's profile, user preferences, installed applications, device type, user behavior, application usage, display settings, device information, etc. In some embodiments the persona profile can also include associated devices of the user. In some embodiments, a persona profile can include websites browsed, changing of location, work patterns, and other observational details. A persona profile can include persona data such as non-observational details, such as user experience, user role, semantic feedback, etc. These can be gathered through other means, such as integration with the ticketing system, queries to the end-user, and role information. A persona profile can refer to one to many, many to one, or many to many. For example, one or more users may be added to a persona profile based on the characteristics and attributes of the persona profile (e.g., creating a grouping of users and respectively associated computing devices. In some embodiments, a persona profile can include shared devices of one or more users.

Using these inputs, embodiments of the present invention can take multiple data points that allow an enterprise environment to be parsed into smaller groupings based on performance needs and results. Embodiments of the present invention defines these groupings by the persona, application profile, and device type. Embodiments of the present invention can leverage machine learning techniques to dynamically create and update membership to each of these groups.

For example, persona is traditionally treated as a consulting effort and is created by monitoring installed applications on a user device, device type, user behavior, and application usage. As trends of personas change, embodiments of the present invention can dynamically update groups of personas and shift criteria using distance-based machine learning algorithms. In this manner, embodiments of the present invention create a uniqueness to each user based on the dynamic profile created for each device. Embodiments of the present invention cluster these profiles into statistically significant groups which allows uniqueness to be applied to each device based on similarity. Embodiments of the present invention can then identify outliers outside of the curve and identify actionable insights by highlighting significant deltas between the majority of the profiles. In this manner, embodiments of the present invention can utilize implicit and explicit feedback by prioritizing the weighting of attributes to increase the effectiveness of the machine learning algorithm to identify which devices and settings should be used. As new applications are detected, embodiments of the present invention create application profile baselines using standard deviation machine learning. Once the new group is created, embodiments of the present invention populate the group with users that match up with the application profile.

Put another way, embodiments of the present can use the 'persona' and 'device profile' and create groupings based on similarity (at this level, Jaccard similarity is fine, per data set). In other words, the individual groups, can be grouped by a weighted Jaccard index. In this embodiment, weighted means that embodiments of the present invention rank title higher than past tickets. Once embodiments of the present invention create multiple clusters of personas, of devices, then embodiments of the present invention provide multiple ways to traverse the relationships between persona and device based on a variety of attribute weighting (reports).

In this embodiment, the device analysis program disclosed herein utilizes machine learning, a metadata attribute system which will tag ticket history and user profiles to additional data sets. These additional datasets could include additional user behavior tracking, trigger questions for feedback or device metrics.

Embodiments of the present invention provide user behavior tracking (with user consent). For example, a user can alert an embodiment of the present invention (the disclosed device analysis program discussed in greater detail below) of multiple browser crashes. Embodiment of the present invention recognize that current solutions cannot solve this problem because there is not enough information to debug the problem being experience. Embodiments of the present invention can detect active website tracking on the affected device that exhibits the previous crash behavior. This data would then be used to spot additional trends. Embodiments of the present invention can then solicit semantic feedback (e.g., user feedback) to gather additional information.

Embodiments of the present invention can leverage additional machine learning algorithms to generate a clustering of multi-sets. The device analysis program automatically creates a weighting coefficient to tighten and loosen clusters. This is a classification system that allows the clustering to be done with a machine determined tolerance based on the number of clusters created. This means, if clusters increase, then tolerance is decreased. This allows the weighting to be determined dynamically by reducing the standard deviation between the groups to show a statistical significance of the variants in the multi-sets.

Figure 1:
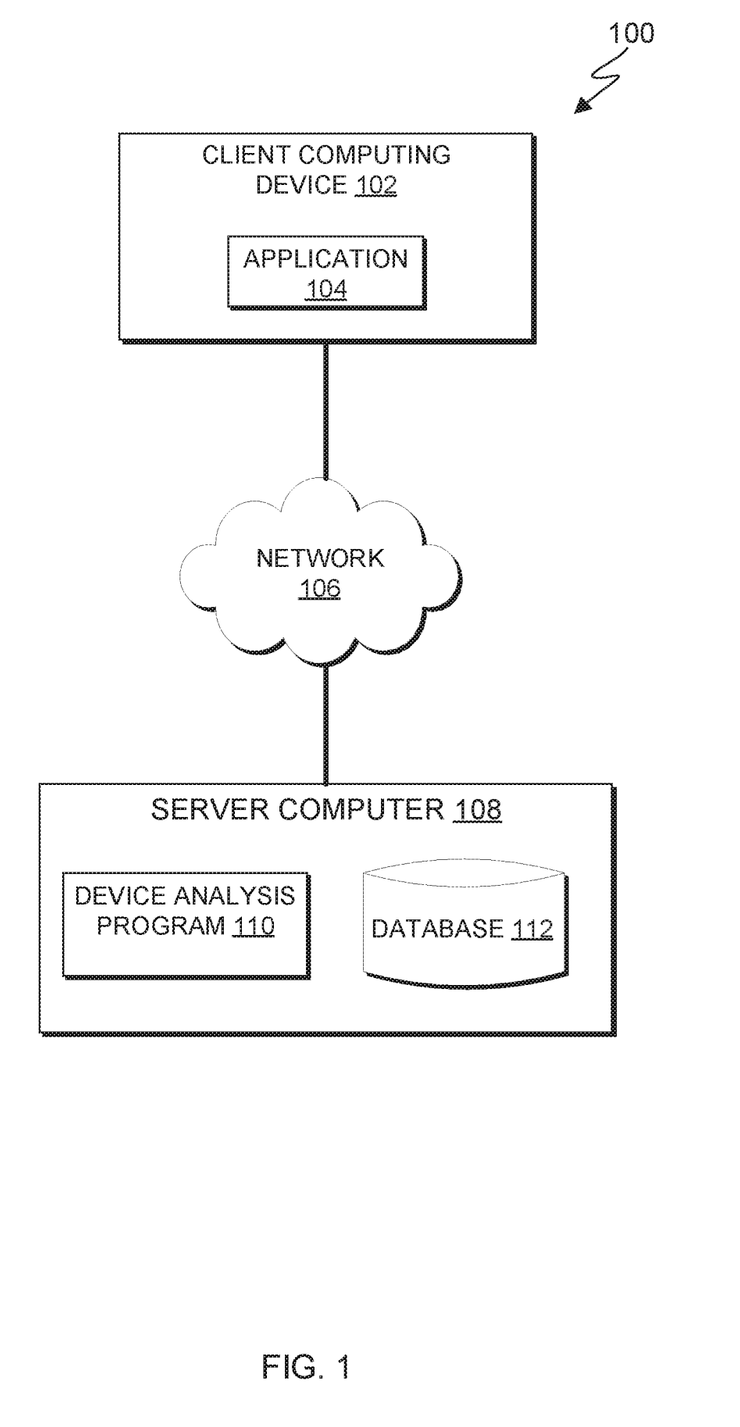
FIG. 1 is a functional block diagram illustrating a computing environment, in accordance with an embodiment of the present invention.

FIG. 1 is a functional block diagram illustrating a computing environment, generally designated, computing environment 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 includes client computing device 102 and server computer 108, all interconnected over network 106. Client computing device 102 and server computer 108 can be a standalone computer device, a management server, a webserver, a mobile computing device, or any other electronic device or computing system capable of receiving, sending, and processing data. In other embodiments, client computing device 102 and server computer 108 can represent a server computing system utilizing multiple computer as a server system, such as in a cloud computing environment. In another embodiment, client computing device 102 and server computer 108 can be a laptop computer, a tablet computer, a netbook computer, a personal computer (PC), a desktop computer, a personal digital assistance (PDA), a smart phone, or any programmable electronic device capable of communicating with various components and other computing devices (not shown) within computing environment 100. In another embodiment, client computing device 102 and server computer 108 each represent a computing system utilizing clustered computers and components (e.g., database server computers, application server computers, etc.) that act as a single pool of seamless resources when accessed within computing environment 100. In some embodiments, client computing device 102 and server computer 108 are a single device. Client computing device 102 and server computer 108 may include internal and external hardware components capable of executing machine-readable program instructions, as depicted and described in further detail with respect to FIG. 8.

Client computing device 102 is a digital device associated with a user and includes application 104. Application 104 communicates with server computer 108 to access device analysis program 110 (e.g., using TCP/IP) to access user information. Application 104 can further communicate with device analysis program 110 to transmit instructions to record data, develop persona groups based on attributes in the recorded data, identify trends between user groups, and generate recommendations as discussed in greater detail with regard to FIGS. 2-7.

Network 106 can be, for example, a telecommunications network, a local area network (LAN), a wide area network (WAN), such as the Internet, or a combination of the three, and can include wired, wireless, or fiber optic connections. Network 106 can include one or more wired and/or wireless networks that are capable of receiving and transmitting data, voice, and/or video signals, including multimedia signals that include voice, data, and video information. In general, network 106 can be any combination of connections and protocols that will support communications among client computing device 102 and server computer 108, and other computing devices (not shown) within computing environment 100.

Server computer 108 is a digital device that hosts device analysis program 110 and database 112. In this embodiment, device analysis program 110 resides on server computer 108 and can be implemented in a 5G infrastructure that interacts with cloud computing servers. In other embodiments, device analysis program 110 can have an instance of the program (not shown) stored locally on client computer device 102. In yet other embodiments, device analysis program 110 can be stored on any number or computing devices (e.g., a smart device). As discussed in greater detail with regard to FIG. 2, device analysis program 110 can include one or more other components not shown in FIG. 1.

In this embodiment, device analysis program 110 generates insights and recommendations for hardware and software application improvement based on explicit (e.g., performance metrics) and implicit contextual feedback (e.g., user feedback). In this embodiment, device analysis program 110 generates insights and recommendations by identifying applications installed in a user device and identifying attributes within the applications.

Device analysis program 110 can develop real time persona groups based on the identified attributes and user profiles. For example, device analysis program 110 can identify groups of individuals having matching device set ups (e.g., same or similar, within a certain percentage, hardware and software applications installed on a device). For example, device analysis program 110 can identify and classify users into a group based on operating systems and versions of the operating system (e.g., installed updates)

Device analysis program 110 can then monitor explicit performance metrics (e.g., processing power, display, connection speed, etc.) and solicit user feedback (e.g., implicit) for user experience. Continuing the above example, device analysis program 110 can then solicit user feedback based on a recent update to a version of the operating system.

Device analysis program 110 can then generate a statistical distribution of user satisfaction and performance metrics and identify outliers having a higher or greater deviation (e.g., can identify one standard deviation). Device analysis program 110 can then identify specific application configuration and performance of the device profile having a higher user satisfaction. Device analysis program 110 can then compare the device profile having higher user satisfaction to device profiles having lower user satisfaction to identify and suggest changes to the device profiles having lower user satisfaction.

Device analysis program 110 can then iteratively refine its recommendation based on subsequent modifications and additions to device profiles. In this manner, device analysis program 110 can improve its recommendations based on explicit and implicit performance metrics.

In this embodiment, database 112 functions as a repository for stored content. In this embodiment, content includes user profiles, device profiles and persona profiles. In some embodiments, database 112 can include ticket history or requests to participate in application and device improvement. Database 112 can reside on a cloud infrastructure and stores user generated information. In some embodiments, database 112 can function as a repository for one or more files containing user information. In this embodiment, database 112 is stored on server computer 108 however, database 112 can be stored on a combination of other computing devices (not shown) and/or one or more components of computing environment 100 (e.g., client computing device 102) and/or other databases that has given permission access to Device analysis program 110.

In general, database 112 can be implemented using any non-volatile storage media known in the art. For example, database 112 can be implemented with a tape library, optical library, one or more independent hard disk drives, or multiple hard disk drives in a redundant array of independent disk (RAID). In this embodiment database 112 is stored on server computer 108.

Figure 2:
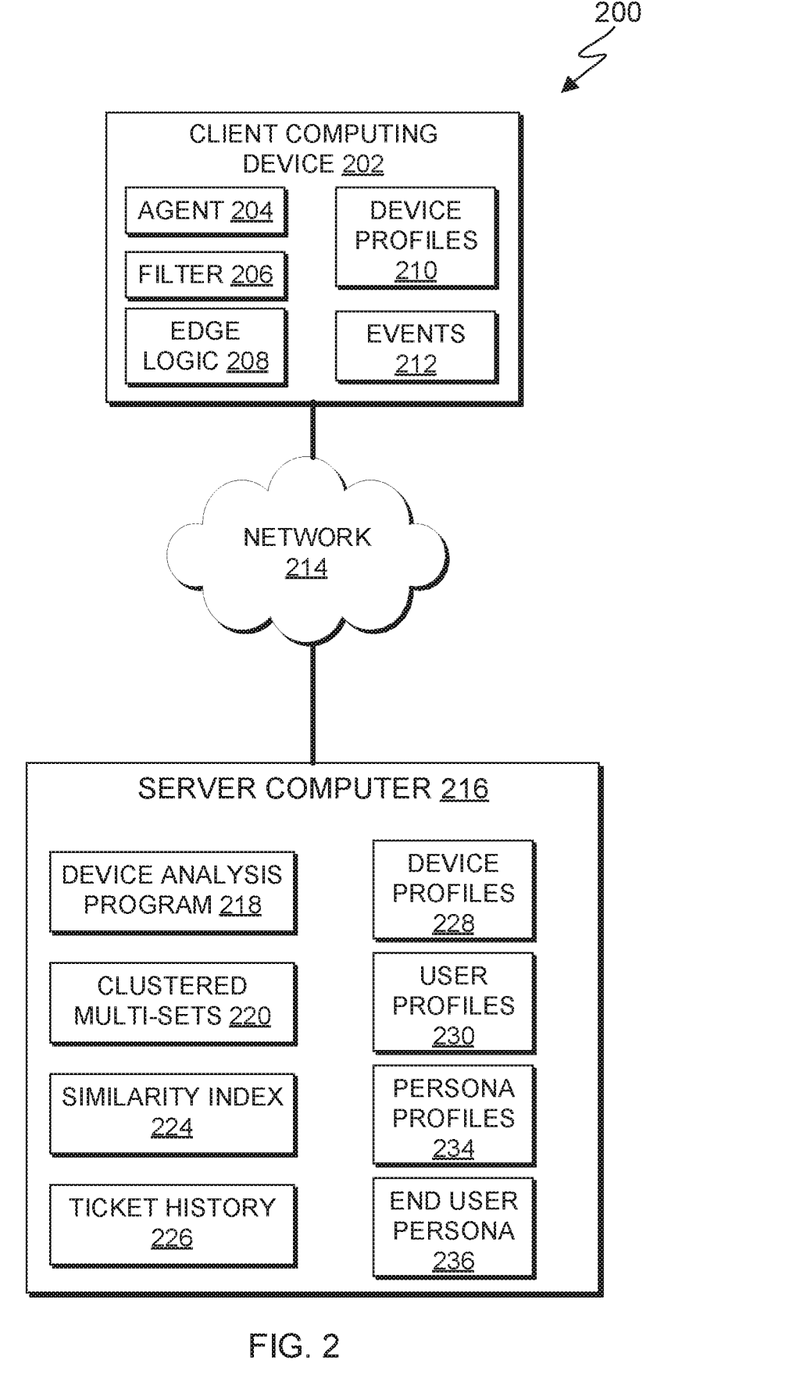
FIG. 2 is a functional block diagram illustrating another computing environment, in accordance with an embodiment of the present invention.

FIG. 2 is a functional block diagram illustrating another computing environment, in accordance with an embodiment of the present invention.

Computing environment 200 includes client computing device 102 and server computer 108, all interconnected over network 214. Client computing device 202 and server computer 216 can be a standalone computer device, a management server, a webserver, a mobile computing device, or any other electronic device or computing system capable of receiving, sending, and processing data. In other embodiments, client computing device 202 and server computer 216 can represent a server computing system utilizing multiple computers as a server system, such as in a cloud computing environment. In another embodiment, client computing device 202 and server computer 216 can be a laptop computer, a tablet computer, a netbook computer, a personal computer (PC), a desktop computer, a personal digital assistance (PDA), a smart phone, or any programmable electronic device capable of communicating with various components and other computing devices (not shown) within computing environment 200. In another embodiment, client computing device 202 and server computer 216 each represent a computing system utilizing clustered computers and components (e.g., database server computers, application server computers, etc.) that act as a single pool of seamless resources when accessed within computing environment 200. In some embodiments, client computing device 202 and server computer 216 are a single device. Client computing device 202 and server computer 216 may include internal and external hardware components capable of executing machine-readable program instructions, as depicted and described in further detail with respect to FIG. 8.

Client computing device 202 is a digital device associated with a user and includes agent 204, filter 206, edge logic 208, device profiles 210, and events 212. Application 204 communicates with server computer 108 to access device analysis program 218 (e.g., using TCP/IP) so that device analysis program 218 can access user and device information. Agent 204 can further communicate with device analysis program 218 to transmit instructions to record data, develop persona groups based on attributes in the recorded data, identify trends between user groups, and generate recommendations as discussed in greater detail with regard to FIGS. 3-7.

Filter 206 refers to a module within client computing device 202 that filters requests from device analysis program 218. Filter 206 provides a way to "cleanse" any data that is forwarded upward to a control server. An example is a polling interval to reduce the amount of data put onto the network that is a sampling of a real time data stream. If the filter (e.g., filter 206) is set to send a data point every minute, but the data is real time, it will skip 59 data elements and send the 60th.

Edge logic 208 refers to a module within client computing device 202 that can perform edge computing processes on client computing device 202 or communicate with other edge logic modules to process information. In this embodiment, edge logic 208 provides additional filter capabilities. Edge logic 208 can cleanse data, apply if/then logic, learn persona logic, and can add filter instructions as described in greater detail below.

Edge logic 208 can cleanse data by normalizing data labels and data sets. Edge logic 208 can receive captured data labels with different names across operating system platforms and can have difference decimal places. Edge logic 208 normalizes these values to enable computer based evaluations easier.

Edge logic 208 can further utilize if/then logic to correlate additional data to be collective if a certain condition is met. For example "If CPU >95%, then capture process list and browser tags". This can limit the amount of data being captured but enables a snapshot of important details that are needed to do more complex clustering at the control server.

Edge logic 208 can learn over time what additional data elements that need to be collected over time. For example, if a user experiences frequent browser crashes, embodiments of the present invention may recognize that a sensor needs to be created to capture browser tab data. Once this is done the first time, edge logic 208 learns from the control server (e.g., via machine learning) to collect this information in the future. Edge logic 208 can a machine learning approach to provide a self-regulating way to keep network data minimized, but it ensures when additional information is needed, it can be automatically collected.

Edge logic 208 is able to process all data that it receives (i.e., edge logic does not drop any data). Put another way, if it there is real time streams or more frequently collected information, edge logic 208 provides instructions for when the data set is passed to the filter (e.g., filter 206), such as take the mean, take the mode, take the median, or take the highest in a range. Edge logic 208 passes the instructions to the filter, with the mean, mode, median and range, so that the logging capability is handled by filter 206 for all data, to ensure data is available if debugging is needed.

Device profile 210 includes metadata containing hardware and software currently installed on client computing device 202. For example, device profile 210 can include hardware information and applications installed on client computing device 202. Device profile 210 can also include version information of a software or operating system.

Events 212 represents one or more actions executed by client computing device 202. For example, an event can include an executed command such as (e.g., retrieve, display, process, etc.). Events 212 can also include update information and version information associated with an installed application. Events 212 can be one or more actions taken by a user (e.g., a decision by the user to delay an installation of an update).

Network 214 is representative of network 106 and can be, for example, a telecommunications network, a local area network (LAN), a wide area network (WAN), such as the Internet, or a combination of the three, and can include wired, wireless, or fiber optic connections. Network 214 can include one or more wired and/or wireless networks that are capable of receiving and transmitting data, voice, and/or video signals, including multimedia signals that include voice, data, and video information. In general, network 214 can be any combination of connections and protocols that will support communications among client computing device 202 and server computer 216, and other computing devices (not shown) within computing environment 200.

Server computer 216 is representative of a digital device that hosts device analysis program 218 (e.g., similar to server computer 108. In this embodiment, device analysis program 218 functions in the same way as device analysis program 218. Device analysis program 218 can generate clustered multi-sets 218, similarity index 224, and ticket history 226, persona profiles 234, and end user persona 236. Server computer 216 further includes device profiles 228, user profiles 230.

In this embodiment, clustered multi-sets 220 include clustered groups of users having similar device profiles (e.g., hardware and software configurations). Similarity index 224 refers to a similarity index generated by device analysis program 218 and is used to measure a degree of similarity between one user and associated device profile and another user and respective device profile. In response to device analysis program 218 determining that a predetermined similarity threshold has been reached or exceeded, device analysis program 218 can add each of those users and corresponding device profiles to a created group. In this embodiment, a numerical scale is used (e.g., 0 to 100), where lower numbers indicate a lower degree of similarity and higher numbers indicate a greater degree of similarity.

In this embodiment, server computer 216 includes ticket history 226. Ticket history 226 is a database of received requests for optimization and previous queries made by an end user. Ticket history can include one or more previous actions taken by the user and can include version an application history. Ticket history can include past tickets opened by an end user to complain about performance, requests for a password reset, requests to install new software, etc. Device analysis program 218 can contribute to the creation of the device profile and the end user persona to better understand how the interaction between the end user and the device is occurring. Ticket history can also provide a way to assess an end user's technical fluency by weighting past questions and calculating a score by quantity and/or frequency of tickets.

Device profiles 228 can contain application profiles (e.g., infrastructure information, RAM capacity, I/O expectation, .net versus java, etc.). In general device profiles 228 refers to hardware and software information installed on a respective computing device. Device analysis program 218 can receive or otherwise access device profiles 228 to create clustered groups of devices and users (e.g., clustered multi-sets 220).

User profiles 230 refers to user preferences. In some embodiments, user profiles can include user performance requirements. User profiles 230 can contain application usage data (i.e., common functions or commands executed by the user). In yet other embodiment user profiles 230 can include user feedback. Device analysis program 218 can combine information from device profiles and user profiles to generate clustered datasets based on similarities identified in each profile.

Device analysis program 110 can store existing persona files (e.g., persona profiles 234). A persona profile refers to individual information associated with a user and can be found in a user's profile, user preferences, installed applications, device type, user behavior, application usage, display settings, device information, etc. In some embodiments the persona profile can also include associated devices of the user. In some embodiments, a persona profile can also include location information of a user. Device analysis program 110 can compare existing personal profiles (e.g., persona profiles 234) to a user's end user persona to generate recommendations to either the end user's device or to modify devices in the cluster multi-sets of devices. For example, device analysis program 218 can identify that a device associated with an end user's persona profile (e.g., end user persona 236) is performing one standard deviation below performance and experience metrics of persona profiles that match the end user's device, then device analysis program 218 can suggest and subsequently implement changes to the end user's device settings to improve performance.

Figure 3:
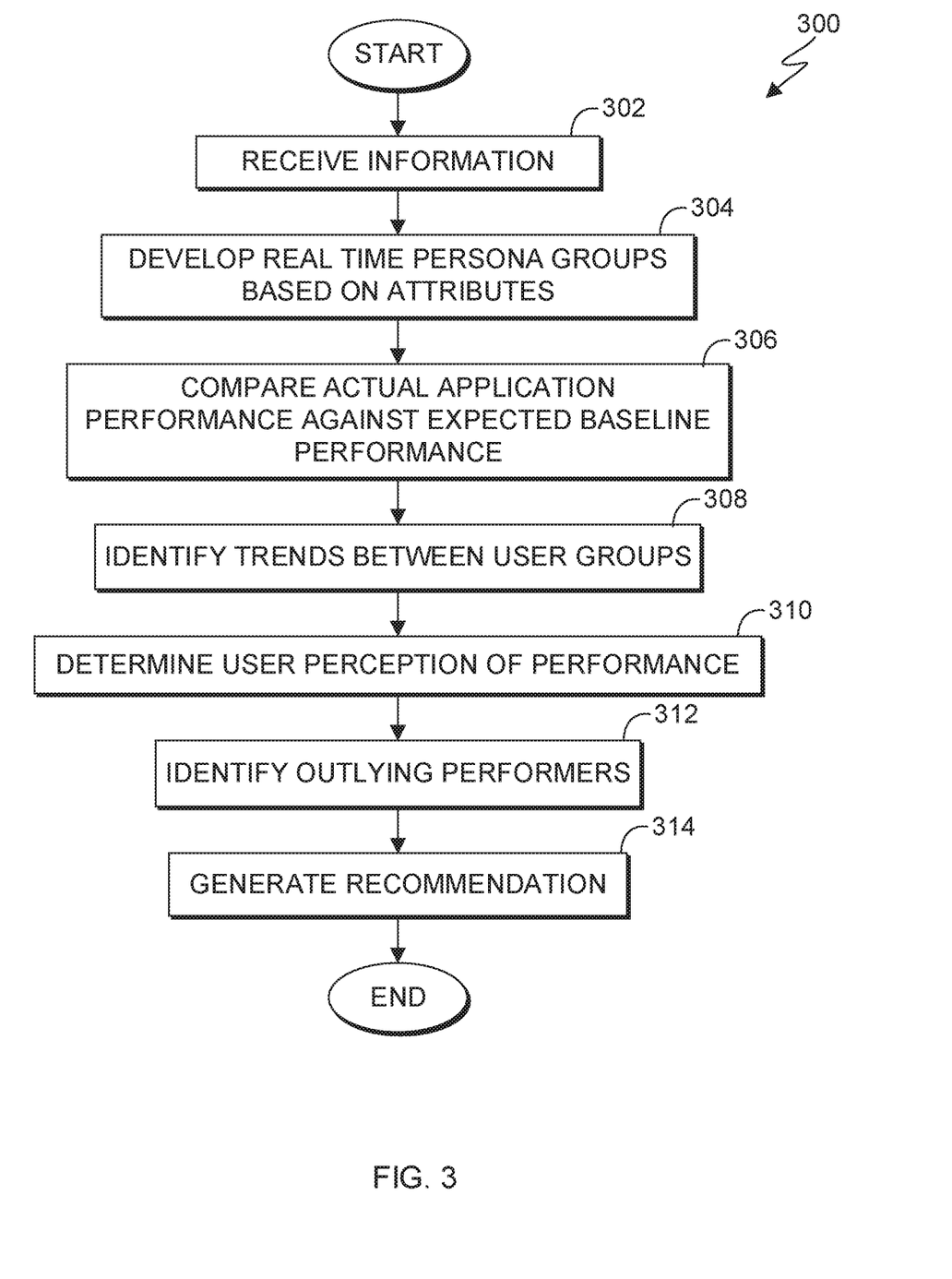
FIG. 3 is a flowchart depicting operational steps for contextual analysis of performance metrics, in accordance with an embodiment of the present invention.

FIG. 3 is a flowchart depicting operational steps for contextual analysis of performance metrics, in accordance with an embodiment of the present invention In step 302, device analysis program 110 receives information. In this embodiment, device analysis program 110 receives information by transmitting instructions to an agent installed on client computing device 102 to transmit information to device analysis program 110. In this embodiment, information can include performance metrics can include response time, channel capacity, latency, completion time, service time, bandwidth, throughput, relative efficiency, scalability, performance per watt, compression ratio, instruction path length and speed up, CPU benchmarks, etc. Information can also include user behavior such as commands executed by a user, user patterns while using an application (e.g., using a particular web browser and search engine to search for queries). Information can also include attribute information for each application installed on the user device (e.g., client computing device). Attribute information can include version information, patches installed, operating systems used, etc.

In step 304, device analysis program 110 develops real time persona groups. In this embodiment, device analysis program 110 develops real time persona groups based on the received information. In this embodiment, device analysis program 110 identifies attributes from the received information and groups users according to similarity of device hardware, software and user behavior. Attributes can include user flags and metadata that indicate job role, respective device types, respective physical locations, respective hardware models, respective software inventory, and respective usage data. In this embodiment, device analysis program 110 leverages machine learning and time sequencing pattern recognition to group users based on the received information (e.g., using the user profile and device profile), to create groupings according to a weight Jaccard index, that is, more recent issues or requests would be ranked higher than past requests. Device analysis program 110 can then use a metadata attribute system to tag user requests, user feedback, and user experience. Device analysis program 110 can also track user behavior and solicit user feedback.

Device analysis program 110 can then populate the created groupings with users and respectively associated devices and applications in the created groups (e.g., group clusters of personas) having similar device and hardware configurations. Device analysis program 110 clusters multi-sets (e.g., groupings of users and their devices and applications) into these persona groups by automatically creating a weighting coefficient to tighten and loosen clusters. Device analysis program 110 can leverage a classification system that allows the clustering to be done with a machine determined tolerance based on the number of clusters created. This means, if clusters increase, then tolerance is decreased. This allows the weighting to be determined dynamically by reducing the standard deviation between the groups to show a statistical significance of the variants in the multi-sets In step 306, device analysis program 110 compares actual application performance against expected baseline performance. In this embodiment, device analysis program 110 records application performance and compares the actual application performance against an expected baseline performance. Device analysis program 110 can then identify differences in performance as discussed in greater detail in step 308.

In step 308, device analysis program 110 identifies trends between user groups. In this embodiment, device analysis program 110 identifies trends in between groups by identifying differences in hardware and software configurations of devices within a user (i.e., persona) group. For example, device analysis program 110 can identify that three users on a group have experienced high user experience ratings when using a particular application but one user in the group has a below average user experience rating. Device analysis program 110 can then compare application performance by identifying version history, installed patches, extensions, add-ons to identify differences in devices that have a higher user experience rating than devices having a lower user experience rating In step 310, device analysis program 110 determines user perception of performance. In this embodiment, device analysis program 110 determines user perception of performance by requesting user feedback. In this embodiment, user feedback can include a user experience rating score (UXI rating score). In this embodiment, the UXI rating score is a numerical based scale where lower numbers indicate a lower degree of satisfaction and higher numbers indicate a greater degree of satisfaction. For example, on a numeric scale ranging from zero to ten, a UXI rating score of one would indicate a lower degree of satisfaction than a UXI rating score of nine. In other embodiments, the UXI scale can be configured to include a desired numerical range. User feedback can also include reported problems, self-help actions, request for helps, user answers to questions, or suggestions by the user.

In step 312, device analysis program 110 determines outlying performers. In this embodiment, device analysis program 110 determines outlying performers by generating a statistical distribution of user experience rating scores of devices and applications within a clustered persona group. Inside every multi-set cluster, device analysis program 110 holds the UXI scores as an independent variable (i.e., the UXI scores will be consistent regardless of clustering weightings or tolerance). If the UXI is different inside a cluster, then device analysis program 110 looks for the distances associated with the high UXI and low UXI devices across all devices inside that cluster. This will reduce the number variables through statistical significance (since a lot of variable will exist).

In step 318, device analysis program 110 generates recommendations. In this embodiment, device analysis program 110 finds actions, updates, and recommendations based on the device differences and differences identified outside the statistical distribution. In this example, an action could be a change in configure. An update can include an action that pushes a software patch or self-heal. A recommendation can include fixes, processes changes, and behavior suggest (e.g., not running to applications at the same time).

In instances where device analysis program 110 does not make a recommendation with a statistical significance, device analysis program 110 collects additional information. The additional information can include previous requests for help (e.g., ticket history), semantic feedback, identifying and comparing users within a cluster group to identify device differences, and user behavior.

Device analysis program 110 can further adjust baseline expectations and identified trends based on changes made (e.g., when software is installed due to a recommendation). In this embodiment, device analysis program 110 continually adjusts baseline expectations, performance metrics as additional data is gathered.

Figure 4:
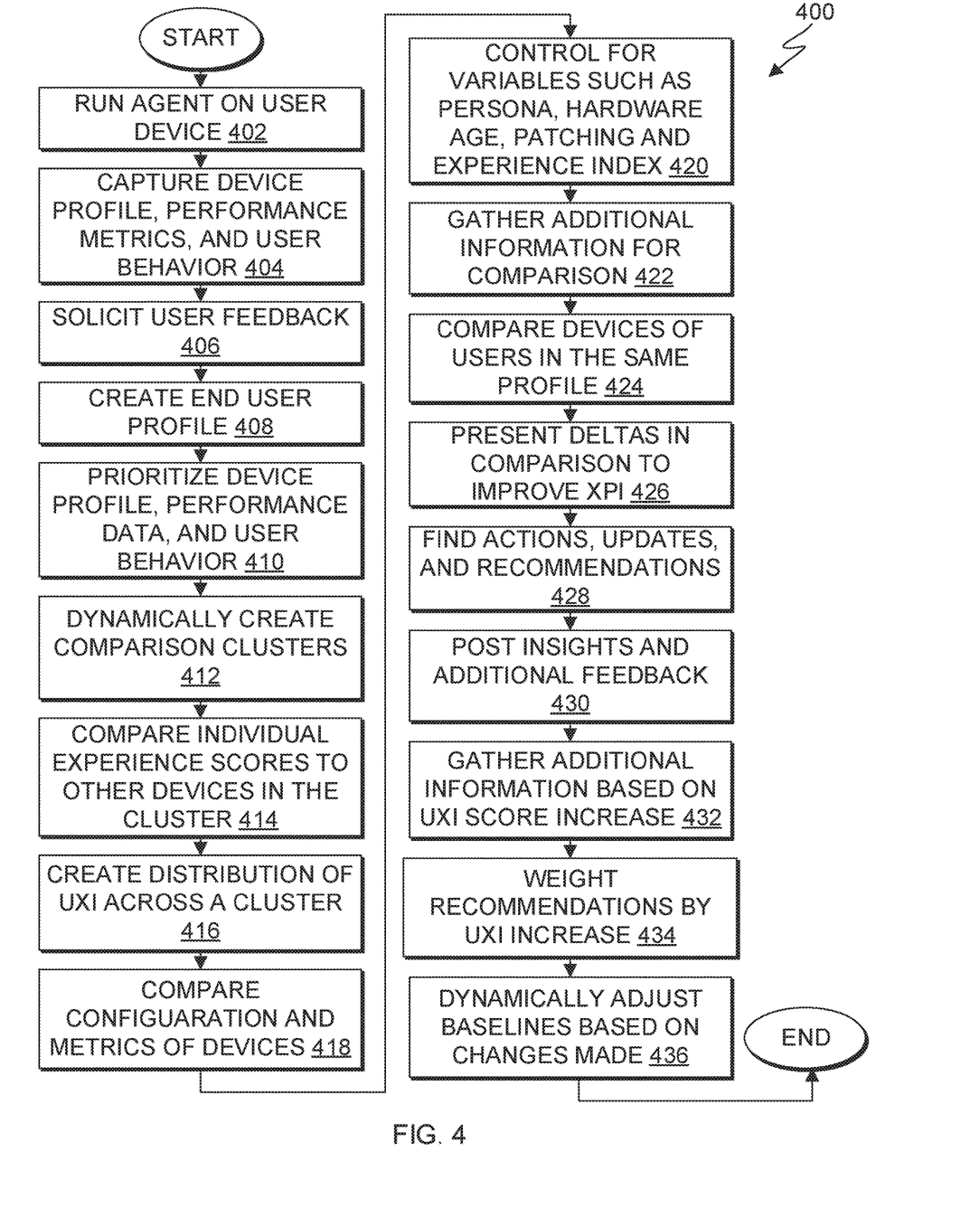
FIG. 4 is a flowchart depicting operational steps for an alternate contextual analysis of performance metrics, in accordance with an embodiment of the present invention.

FIG. 4 is a flowchart depicting operational steps for an alternate contextual analysis of performance metrics, in accordance with an embodiment of the present invention.

In step 402, device analysis program 110 runs an agent on a user device. In this embodiment, device analysis program 110 transmits instructions to an agent on user device to send device information to device analysis program 110.

In step 404, device analysis program 110 captures device profile, performance metrics and user behavior. In this embodiment, device analysis program 110 captures device profile, performance metrics, and user behavior from the user device. For example, device analysis program 110 can transmit instructions to an agent on the user device to transmit requested information (e.g., device profile, performance metrics, and user behavior. In this embodiment, device profile can include hardware and software installed on the user device. Performance metrics can include response time, channel capacity, latency, completion time, service time, bandwidth, throughput, relative efficiency, scalability, performance per watt, compression ratio, instruction path length and speed up. CPU benchmarks, etc. User behavior can include commands executed by a user, user patterns while using an application (e.g., using a particular web browser and search engine to search for queries).

In step 406, device analysis program 110 solicits user feedback. In this embodiment, device analysis program 110 solicits user feedback from the user (e.g., from client computing device 102) via network 106. In this embodiment, user feedback can include a user experience rating score (UXI rating score). In this embodiment, the UXI rating score is a numerical based scale where lower numbers indicate a lower degree of satisfaction and higher numbers indicate a greater degree of satisfaction. For example, on a numeric scale ranging from zero to ten, a UXI rating score of one would indicate a lower degree of satisfaction than a UXI rating score of nine. In other embodiments, the UXI scale can be configured to include a desired numerical range. User feedback can also include reported problems, self-help actions, request for helps, user answers to questions, or suggestions by the user.

In step 408, device analysis program 110 creates an end user profile. In this embodiment, device analysis program 110 creates an end user profile by combining the received information. For example, device analysis program 110 combines device profile information, performance metrics, user behavior, and user feedback. Device analysis program 110 includes geotagged information, application usage, changing of geotag frequency, network traffic, working file sizes, and other attributes associated with defining the end user type.

In step 410, device analysis program 110 prioritizes device profile, performance data, and user behavior. In this embodiment, device analysis program 110 prioritizes device profile, performance data, and user behavior by feedback engagement. Device analysis program 110 can perform an experience assessment at the edge with user polling to drive machine learning reinforcement. As mentioned before, device analysis program 110 uses a metadata attribute system which will tag ticket history (e.g., user feedback and request for helps) and user profiles to additional data sets (e.g., user behavior tracking, trigger questions for feedback or device metrics).

In step 412, device analysis program 110 dynamically creates comparison clusters from the prioritized device profile, performance data, and user behavior metrics. In this embodiment, device analysis program 110 dynamically creates comparison clusters within a degree of similarity. For example, device analysis program 110 can group a cluster of devices based on at least four attributes (e.g., application, operating system, versioned upgrades, and usage experience).

In step 414, device analysis program 110 compares individual experience scores to other devices in the cluster. In this example, device analysis program 110 compares individual experience scores to other devices in the cluster by identifying and referencing the individual experience scores for comparison. For example, in a cluster of three devices, device 1 can have a user experience score of five, device 2 can have a user experience score of five, and device 3 can have a user experience score of two.

In step 416, device analysis program 110 creates a distribution of user experience scores. In this embodiment, device analysis program 110 creates a distribution of user experience scores using a statistical distribution machine learning algorithm. Continuing the example above, device analysis program 110 can create a graph of UXI scores and show that two thirds of the group of devices have a user experience score of five and an outlier of an UXI score of two. In step 418, Device analysis program 110 can then compare the UXI score of the lowest device or application to the device having the highest UXI score.

In step 418, device analysis program compares configuration and metrics of devices. In this embodiment, device analysis program 110 compares configuration and metrics of devices by identifying variables that differ and determining that the identified variables may account for the varying user experience. For example, device analysis program 110 can identify that device 1 crashed when visiting a website. Device analysis program 110 can identify that device 2 (in the same cluster, having the same browser and also visiting the same website did not experience a crash). Device analysis program 110 can identify that device 2 installed a patch while device 1 did not.

In step 420, device analysis program 110 controls for variables that might affect UXI score and performance scores. In this embodiment, device analysis program 110 controls for variables such as persona profiles, hardware age, patching and experience index. Continuing the example above, device analysis program 110 can control for the patch not installed in device 1 by installing the patch on device 1.

In step 422 device analysis program 110 gathers additional information for comparison when necessary. In this embodiment, device analysis program gathers additional information based on ticket history (e.g., previous submissions for help with a problem). Device analysis program 110 can capture semantic feedback to find out what issues an end-user has experienced.

In step 424, device analysis program 110 compares devices of users in the same profile. In this embodiment, device analysis program 110 can then, based on similarity, compare users in the same profile to identify devices differences. For example, device analysis program can compare additional information from Lightweight Directory Access Protocol (LDAP), Identity Access Management, or IT Service Management (ITSM) entitlement and configuration. Device analysis program 110 can also compare user behavior. In this embodiment, device analysis program 110 leverages machine learning to compare devices. Device analysis program 110 can then identify deltas in the devices.

In step 426, device analysis program 110 present deltas identified from the comparison. In this embodiment, device analysis program 110 can present deltas identified from the comparison to a user (e.g., a system manager or end user) via a user display.

In step 428, device analysis program 110 finds actions, updates, and recommendations. In this embodiment, device analysis program 110 finds actions, updates, and recommendations based on the device differences and the identified deltas. In this example, an action could be a change in configure. An update can include an action that pushes a software patch or self-heal. A recommendation can include fixes, processes changes, and behavior suggest (e.g., not running to applications at the same time).

In step 430, device analysis program 110 can post insights and additional feedback. In this embodiment, device analysis program 110 can optionally post insights and additional feedback to a user and store the insights in a database for retrieval. Device analysis program 110 can leverage machine learning to refine its recommendations by feeding machine learning algorithms the additional feedback and the increase in user experience score ratings associated with the actions performed.

In step 432 device analysis program 110 gathers additional information. In this embodiment, device analysis program 110 gathers additional information based on an increase in user score experience (e.g., performance metrics such as response time, channel capacity, latency, completion time, service time, bandwidth, throughput, relative efficiency, scalability, performance per watt, compression ratio, instruction path length and speed up. CPU benchmarks, etc. and user behavior such as commands executed by a user, user patterns while using an application).

In step 434, device analysis program 110 weights recommendations. In this embodiment, device analysis program 110 weights recommendations. For example, device analysis program 110 gives greater weight to recommendations that, when performed, resulted in an increased user experience rating.

In step 436, device analysis program 110 dynamically adjusts baselines of devices. In this embodiment device analysis program 110 dynamically adjusts baseline performance metrics of devices based on changes that were made to device configurations that resulted in an increase in user experience ratings. Device analysis program 110 can then readjust the similarity clusters it previously built based on the impact of the changes made.

Figure 5:
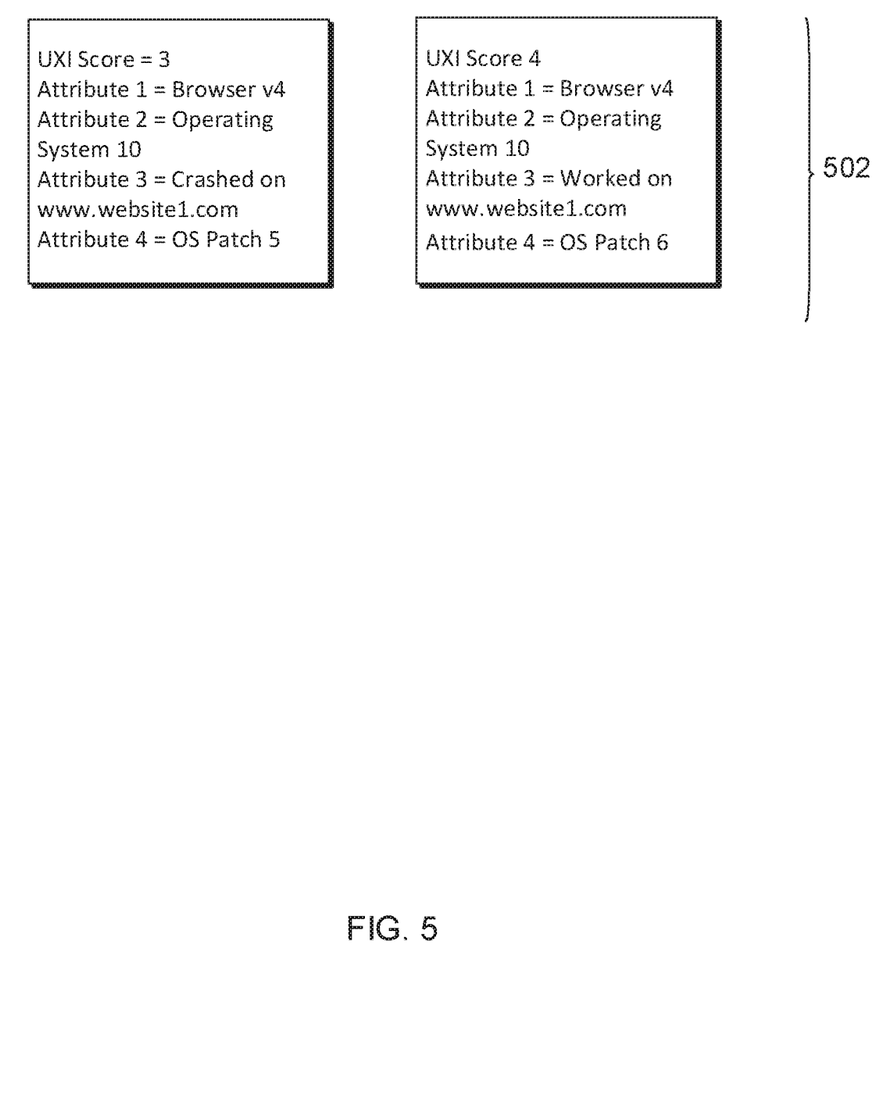
FIG. 5 is an example of a cluster, in accordance with an embodiment of the present invention.

FIG. 5 is an example of a cluster group, in accordance with an embodiment of the present invention.

In this example, there are two applications in a cluster group 502. Each application has four attributes and a User Experience Index score (UXI score). In this cluster, device analysis program 110 has identified a difference in the UXI score. One application has a UXI score of 3, while the other has a UXI score of 4. Device analysis program 110 has identified that attributes one and two are the same, that is the application is a web browser, version 4 running on the same operating system. In this example, device analysis program 110 identifies that attribute three differs, that is, on one application, attribute three noted a crash on a website crashed while in another application the website did not crash. Device analysis program identifies that attribute four also differs. In the application that crashed when loading the website had a an older, OS version 5 patch while the application that did not crash had a newer OS version 6 patch.

Device analysis program 110 can create a multi set to compare this cluster group based on similarity and uses artificial intelligence to adjust tolerance on the similarity between groups and weights. Once device analysis program 110 creates these clusters, the attributes (i.e., insights) show recommendations based on the delta. In this example, device analysis program 110 can then identify and recommend that the application that experienced the crash needs to update to OS version 6 patch from the generated multi-sets. These recommendations can then be classified into a fix and subsequently push an update to the affected application, generate behavioral advice, or provide feedback to the end user (e.g., system managers to make a complex change).

Figure 6:
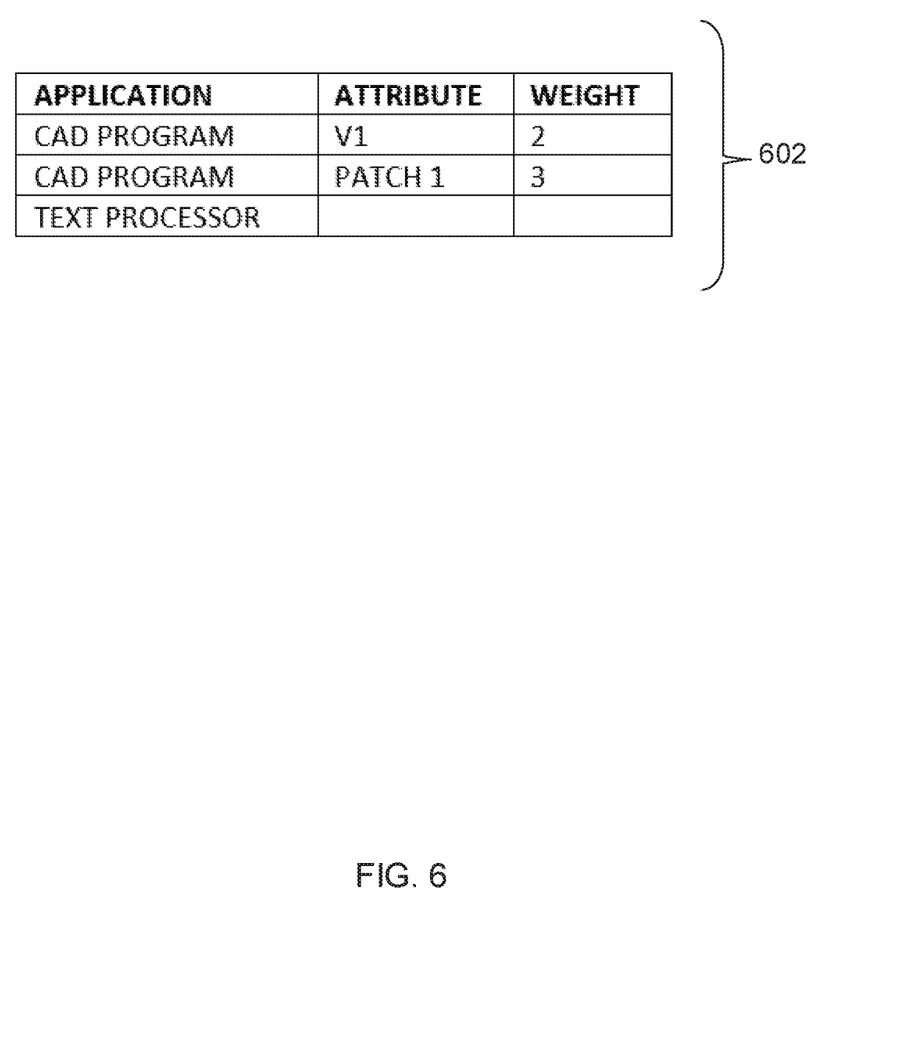
FIG. 6 is an example of an identified problem with a system update, in accordance with an embodiment of the present invention.

FIG. 6 is an example of an identified problem with a system update, in accordance with an embodiment of the present invention.

In this example, multiple computing systems within a network of computing system is upgrading from an operating system version 7 to an operating system version 10. Success could include a massive variety of factors, from firmware, age, application compatibility, battery levels, etc. In this example, an update from one operating system version to another is a onetime change and at a macro level, should be fine, but there is likely an 8-10% failure due to anomalies.

Device program 110 identified multiple computing system are experiencing a "blue screen" representative of system failure. Device program 110 identifies that the computing system have the same hardware, similar usage, etc., but system failure was common to those affected computing systems. Device analysis program 110 generates multisets and identifies that system failure was caused by the order of patches which had been installed months ago were different and the contributing factor (e.g., from table 602).

In some embodiments, device program 110 can predict success of device upgrades such as operating system upgrades and updates, without needing a static set of prerequisites, but rather a dynamic set of prerequisites based on the likeness of relevant factors which are created from a device profile.

Figure 7:
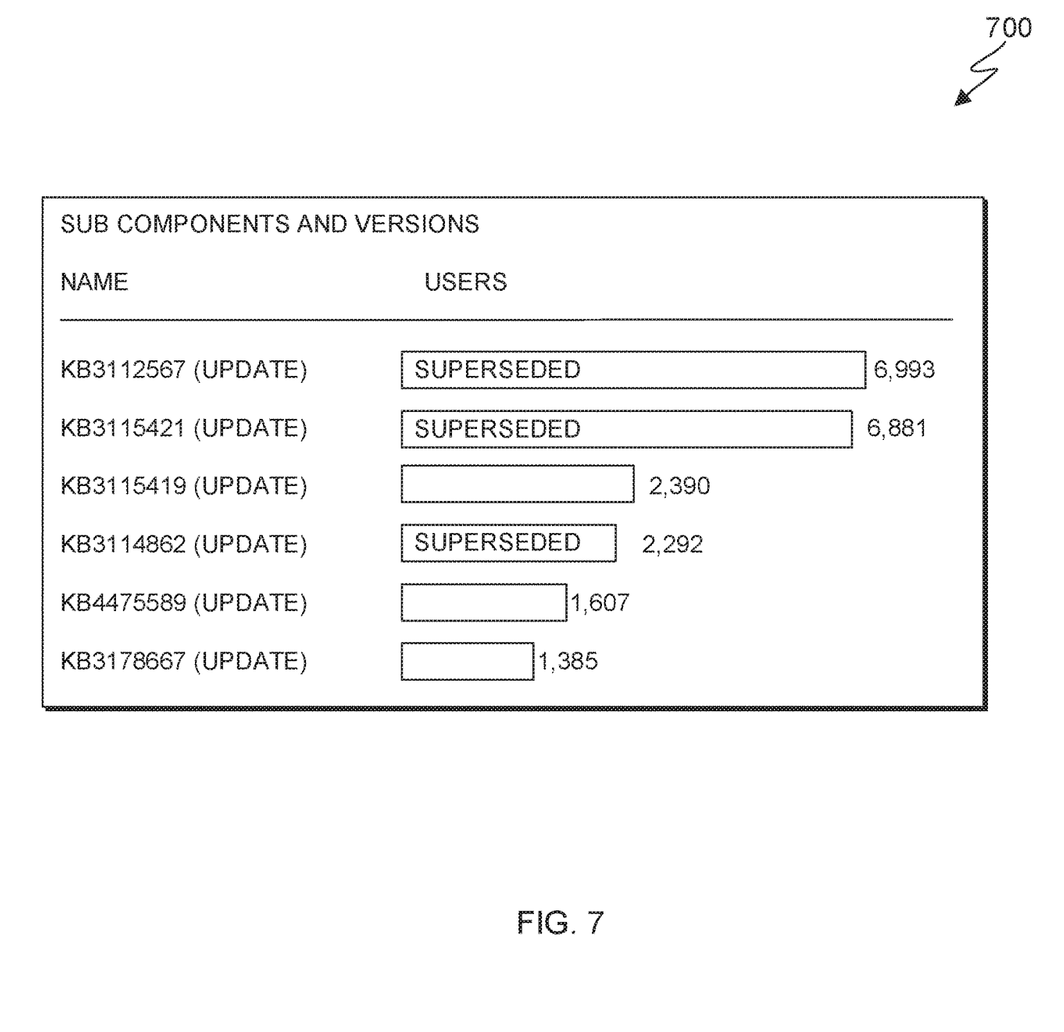
FIG. 7 is an example of multiple patches that are identified as causing an update problem, in accordance with an embodiment of the present invention.

FIG. 7 is an example of multiple patches that are identified as causing an update problem, in accordance with an embodiment of the present invention.

In general, FIG. 7 continues the example of FIG. 6. Device analysis program 110 pulls up a subcomponents and versions list 700. Device analysis program 110 can then generate multisets and identify that several of the top affected updates are superseded. In other words, the computing systems that did not experience an update failure did not install KB3112567, KB3115421, and KB 3114862. Accordingly, device analysis program 110 can then determine if they are still deployed via System Center Configuration Manager (SCCM) and remove from those patches from deployment. Device analysis program 110 can then suggest other strategies for remedying the failure. For example, if those patches are not deployed, check SCCM client health and\or run and update troubleshooter. For the updates that are still applicable, the failed update leaves machines non-compliant and vulnerable to a number of exploits. To resolve, device analysis program 110 can restart the device and then install the updates manually. In addition, device analysis program 110 can suggest a system restore to revert to the state before the failed updates or use the operating system troubleshooter to diagnose and fix the update problems. Finally, device analysis program can suggest that more details can be obtained by reviewing SCCM and operating system update logs.

Figure 8:
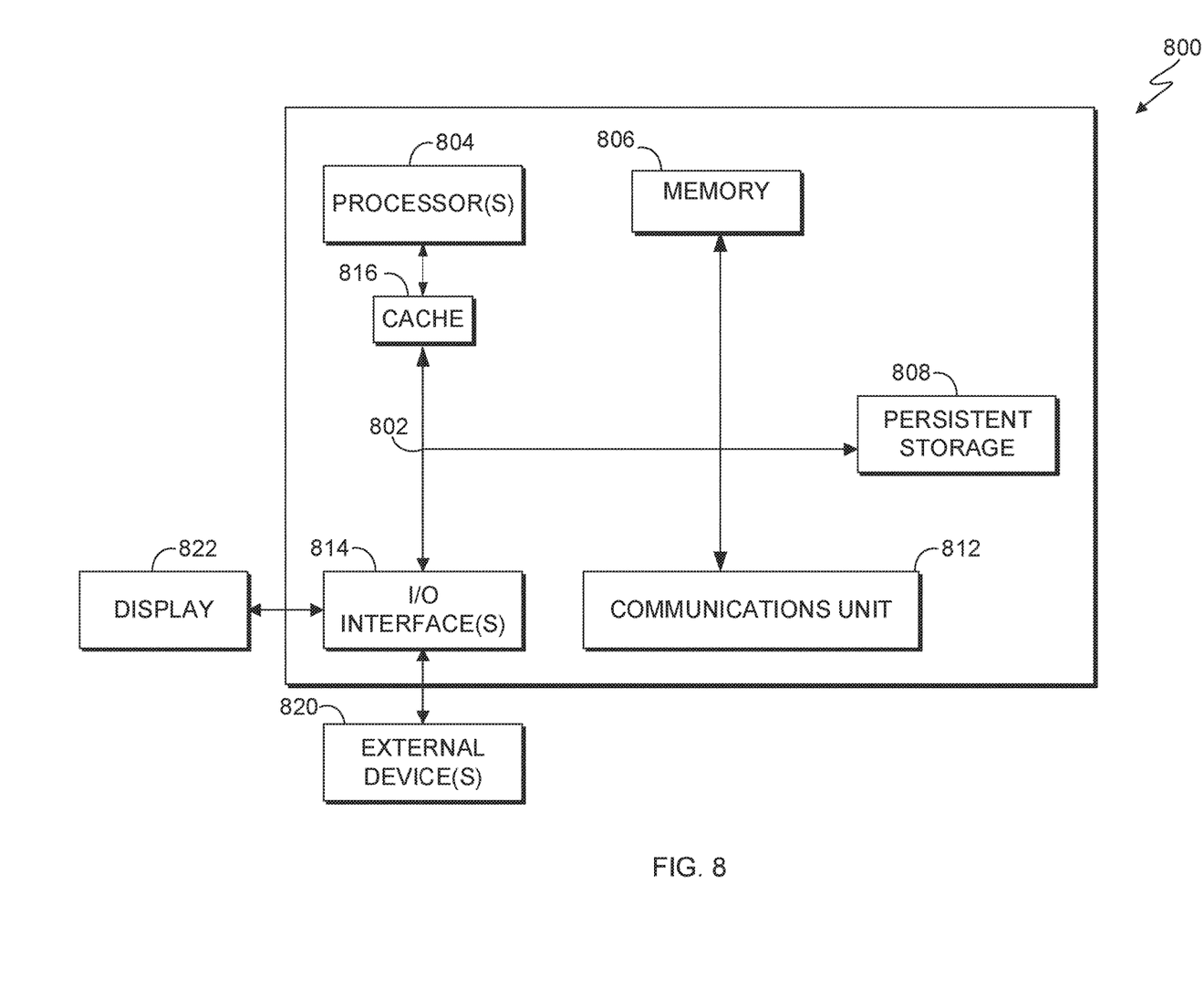
FIG. 8 depicts a block diagram of components of the computing systems of FIG. 1, in accordance with an embodiment of the present invention.

FIG. 8 depicts a block diagram of components of computing systems within computing environment 100 of FIG. 1, in accordance with an embodiment of the present invention. It should be appreciated that FIG. 8 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Computer system 800 includes communications fabric 802, which provides communications between cache 816, memory 806, persistent storage 808, communications unit 810, and input/output (I/O) interface(s) 812. Communications fabric 802 can be implemented with any architecture designed for passing data and/or control information between processors (such as microprocessors, communications and network processors, etc.), system memory, peripheral devices, and any other hardware components within a system. For example, communications fabric 802 can be implemented with one or more buses or a crossbar switch.

Memory 806 and persistent storage 808 are computer readable storage media. In this embodiment, memory 806 includes random access memory (RAM). In general, memory 806 can include any suitable volatile or non-volatile computer readable storage media. Cache 816 is a fast memory that enhances the performance of computer processor(s) 804 by holding recently accessed data, and data near accessed data, from memory 806.

Device analysis program 110 (not shown) may be stored in persistent storage 808 and in memory 806 for execution by one or more of the respective computer processors 804 via cache 816. In an embodiment, persistent storage 808 includes a magnetic hard disk drive. Alternatively, or in addition to a magnetic hard disk drive, persistent storage 808 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 808 may also be removable. For example, a removable hard drive may be used for persistent storage 808. Other examples include optical and magnetic disks, thumb drives, and smart cards that are inserted into a drive for transfer onto another computer readable storage medium that is also part of persistent storage 808.

Communications unit 810, in these examples, provides for communications with other data processing systems or devices. In these examples, communications unit 810 includes one or more network interface cards. Communications unit 810 may provide communications through the use of either or both physical and wireless communications links. Device analysis program 110 may be downloaded to persistent storage 808 through communications unit 810.

I/O interface(s) 812 allows for input and output of data with other devices that may be connected to client computing device and/or server computer. For example, I/O interface 812 may provide a connection to external devices 918 such as a keyboard, keypad, a touch screen, and/or some other suitable input device. External devices 818 can also include portable computer readable storage media such as, for example, thumb drives, portable optical or magnetic disks, and memory cards. Software and data used to practice embodiments of the present invention, e.g., device analysis program 110, can be stored on such portable computer readable storage media and can be loaded onto persistent storage 808 via I/O interface(s) 812. I/O interface(s) 812 also connect to a display 820.

Display 820 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   developing real-time groupings of computing devices based on dynamic attributes and respective user experiences;
   identifying trends between the developed real-time groupings of computing devices based, at least in part, on a statistical distribution of user experience scores associated with respective computing devices of the developed real-time groupings of computing devices;
   in response to identifying at least one user experience score outside the statistical distribution, retrieving a profile of the computing device associated with the at least one user experience score outside the statistical distribution and generating one or more recommendations for the computing device based on differences between the computing device having the least one user experience score outside the statistical distribution and computing devices within the real-time grouping of computing devices having respective user experience scores within the statistical distribution; and
   implementing the generated recommendation on the computing device within the developed, real-time grouping.

2. The computer-implemented method of claim 1, further comprising:
   in response to determining that no recommendation of the one or more generated recommendations has a statistical significance, determining data elements that need to be collected to remedy a problem; and iteratively refining the generated one or more recommendations based on explicit and implicit feedback associated with the problem.

3. The computer-implemented method of claim 1, wherein the one or more recommendations include a process change, user behavior suggestions, and an update.

4. The computer-implemented method of claim 1, wherein developing real-time groupings of computing devices based on dynamic attributes comprises:
creating a profile having one or more attributes based on received device, application, and user information and user behavior;
identifying one or more users and respectively associated devices that match the one or more attributes in the created profile; and
grouping the one or more users into the created profile.

5. The computer-implemented method of claim 4, further comprising:
soliciting user feedback from the one or more users in the created profile.

6. The computer-implemented method of claim 1, wherein identifying trends between the developed real time groupings of computing device comprises:
generating a statistical distribution of user experience ratings within the developed, real-time grouping;
identifying outliers in the generated statistical distribution; and
comparing device hardware and application software of devices associated with the identified outliers.

7. The computer-implemented method of claim 1, further comprising:
re-defining baseline expectations for performance of devices within the developed, real-time grouping; and
continually adjusting baseline expectations based on recorded data and software changes to devices within the developed-real-time grouping.

8. A computer program product comprising:
one or more computer readable storage media and program instructions stored on the one or more computer readable storage media, the program instructions comprising:
program instructions to develop real-time groupings of computing devices based on dynamic attributes and respective user experiences;
program instructions to identify trends between the developed real-time groupings of computing devices based, at least in part, on a statistical distribution of user experience scores associated with respective computing devices of the developed real-time groupings of computing devices;
program instructions to, in response to identifying at least one user experience score outside the statistical distribution, retrieve a profile of the computing device associated with the at least one user experience score outside the statistical distribution and generate one or more recommendations for the computing device based on differences between the computing device having the least one user experience score outside the statistical distribution and computing devices within the real-time grouping of computing devices having respective user experience scores within the statistical distribution; and
program instructions to implement the generated recommendation on the computing device within the developed, real-time grouping.

9. The computer program product of claim 8, wherein the program instructions stored on the one or more computer readable storage medium further comprise:
program instructions to, in response to determining that no recommendation of the one or more generated recommendations has a statistical significance, determine data elements that need to be collected to remedy a problem; and
program instructions to iteratively refine the generated one or more recommendations based on explicit and implicit feedback associated with the problem.

10. The computer program product of claim 8, wherein the one or more recommendations include a process change, user behavior suggestions, and an update.

11. The computer program product of claim 8, wherein the program instructions to develop real-time groupings of computing devices based on dynamic attributes comprise:
program instructions to create a profile having one or more attributes based on received device, application, and user information and user behavior;
program instructions to identify one or more users and respectively associated devices that match the one or more attributes in the created profile; and
program instructions to group the one or more users into the created profile.

12. The computer program product of claim 11, wherein the program instructions stored on the one or more computer readable storage medium further comprise:
program instructions to solicit user feedback from the one or more users in the created profile.

13. The computer program product of claim 8, wherein program instructions to identify trends between the developed real time groupings of computing device comprise:
program instructions to generate a statistical distribution of user experience ratings within the developed, real-time grouping;
program instructions to identify outliers in the generated statistical distribution; and
program instructions to compare device hardware and application software of devices associated with the identified outliers.

14. The computer program product of claim 8, wherein the program instructions stored on the one or more computer readable storage medium further comprise:
program instructions to re-define baseline expectations for performance of devices within the developed, real-time grouping; and
program instructions to continually adjust baseline expectations based on recorded data and software changes to devices within the developed-real-time grouping.

15. A computer system comprising:
one or more computer processors;
one or more computer readable storage media; and
program instructions stored on the one or more computer readable storage media for execution by at least one of the one or more computer processors, the program instructions comprising:
program instructions to develop real-time groupings of computing devices based on dynamic attributes and respective user experiences;
program instructions to identify trends between the developed real-time groupings of computing devices based, at least in part, on a statistical distribution of user experience scores associated with respective computing devices of the developed real-time groupings of computing devices;

program instructions to, in response to identifying at least one user experience score outside the statistical distribution, retrieve a profile of the computing device associated with the at least one user experience score outside the statistical distribution and generate one or more recommendations for the computing device based on differences between the computing device having the least one user experience score outside the statistical distribution and computing devices within the real-time grouping of computing devices having respective user experience scores within the statistical distribution; and program instructions to implement the generated recommendation on the computing device within the developed, real-time grouping.

16. The computer system of claim 15, wherein the program instructions stored on the one or more computer readable storage medium further comprise:

program instructions to, in response to determining that no recommendation of the one or more generated recommendations has a statistical significance, determine data elements that need to be collected to remedy a problem; and program instructions to iteratively refine the generated one or more recommendations based on explicit and implicit feedback associated with the problem.

17. The computer system of claim 15, wherein the one or more recommendations include a process change, user behavior suggestions, and an update.

18. The computer system of claim 15, wherein the program instructions to develop real-time groupings of computing devices based on dynamic attributes comprise:

program instructions to create a profile having one or more attributes based on received device, application, and user information and user behavior;

program instructions to identify one or more users and respectively associated devices that match the one or more attributes in the created profile; and program instructions to group the one or more users into the created profile.

19. The computer system of claim 18, wherein the program instructions stored on the one or more computer readable storage medium further comprise:

program instructions to solicit user feedback from the one or more users in the created profile.

20. The computer system of claim 15, wherein program instructions to identify trends between the developed real time groupings of computing device comprise:

program instructions to generate a statistical distribution of user experience ratings within the developed, real-time grouping;

program instructions to identify outliers in the generated statistical distribution; and program instructions to compare device hardware and application software of devices associated with the identified outliers.

* * * * *